United States Patent
Lee et al.

(10) Patent No.: US 9,800,135 B2
(45) Date of Patent: Oct. 24, 2017

(54) RIPPLE SUPPRESSOR

(71) Applicant: Leadtrend Technology Corporation, Zhubei, Hsinchu County OT (TW)

(72) Inventors: Ching-Tsan Lee, Zhubei (TW); Wei-Wen Ou, Zhubei (TW); Chien-Chun Lu, Zhubei (TW)

(73) Assignee: LEADTREND TECHNOLOGY CORPORATION, Zhubei, Hsinchu County (TW)

( * ) Notice: Subject to any disclaimer, the term of this patent is extended or adjusted under 35 U.S.C. 154(b) by 0 days.

(21) Appl. No.: 15/255,193

(22) Filed: Sep. 2, 2016

(65) Prior Publication Data
US 2017/0070143 A1    Mar. 9, 2017

(30) Foreign Application Priority Data
Sep. 4, 2015    (TW) .............................. 104129275 A

(51) Int. Cl.
| | |
|---|---|
| G05F 1/46 | (2006.01) |
| H02M 1/15 | (2006.01) |
| H02M 3/157 | (2006.01) |
| H02M 1/08 | (2006.01) |
| H02M 3/155 | (2006.01) |
| G05F 1/00 | (2006.01) |
| H02M 1/00 | (2006.01) |

(52) U.S. Cl.
CPC ............... *H02M 1/15* (2013.01); *G05F 1/00* (2013.01); *G05F 1/461* (2013.01); *H02M 1/08* (2013.01); *H02M 3/155* (2013.01); *H02M 3/157* (2013.01); *H02M 2001/0009* (2013.01)

(58) Field of Classification Search
CPC ..... G05F 1/00; G05F 1/10; G05F 1/46; G05F 1/461; G05F 1/56; G05F 1/575; G05F 1/70; H02M 1/08; H02M 1/14; H02M 1/15; H02M 2001/0009; H02M 3/155; H02M 3/156; H02M 3/1563; H02M 3/157
USPC ................................. 327/108, 109, 561, 562
See application file for complete search history.

(56) References Cited

U.S. PATENT DOCUMENTS

| | | | | |
|---|---|---|---|---|
| 2014/0085945 A1* | 3/2014 | Kuang | .................... | H02M 1/15 363/46 |
| 2014/0252969 A1* | 9/2014 | Wang | .................. | H05B 33/0809 315/200 R |
| 2015/0123568 A1* | 5/2015 | Yang | .................. | H05B 33/0812 315/297 |

(Continued)

*Primary Examiner* — William Hernandez
(74) *Attorney, Agent, or Firm* — McClure, Qualey & Rodack, LLP

(57) ABSTRACT

A ripple suppressor suppresses ripples of a channel current. The ripple suppressor comprises a voltage-controlled current source, a stabilizer, and an auto-calibration circuit. A control voltage at a control node controls the channel current flowing through a path connecting first and second channel nodes. The voltage-controlled current source receives a current-setting signal to generate the control voltage, so as to stabilize the channel current in response to the current-setting signal. The stabilizer at least provides low-pass filtering to generate and stabilize the current-setting signal in response to a first channel voltage at the first channel node. The auto-calibration circuit controls the stabilizer in response to the control voltage, so as to make the control voltage in compliance with a first predetermined condition.

20 Claims, 7 Drawing Sheets

(56) References Cited

U.S. PATENT DOCUMENTS

2017/0006675 A1\* 1/2017 van den Broeke ..... H02M 1/08
2017/0181234 A1\* 6/2017 Huang ................... H02M 1/14

\* cited by examiner

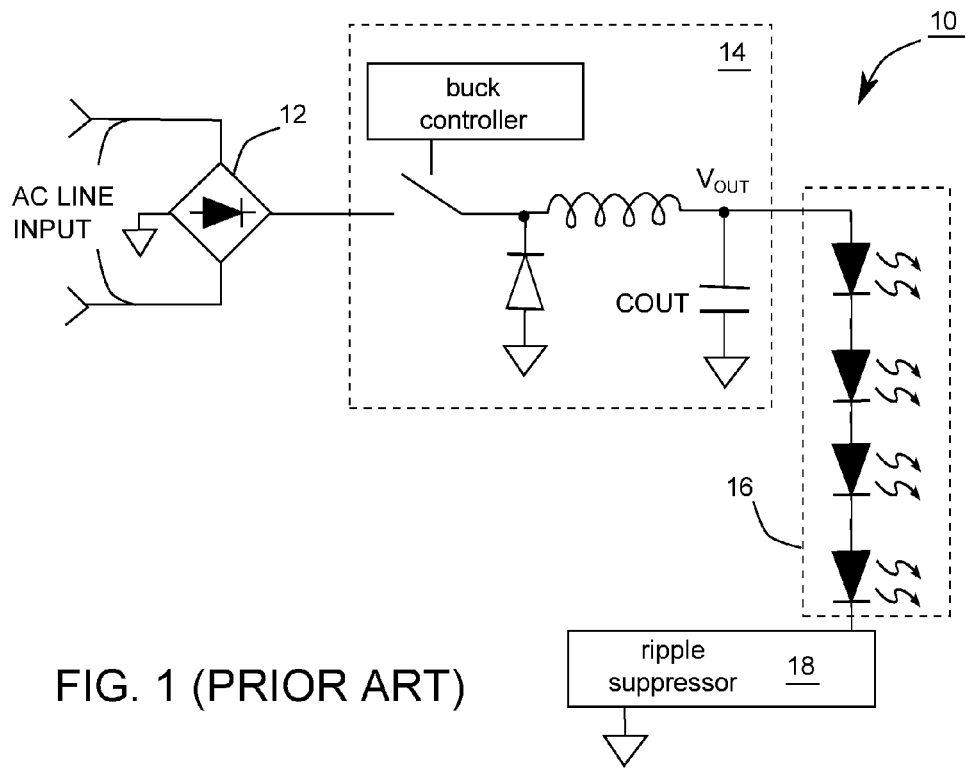
FIG. 1 (PRIOR ART)
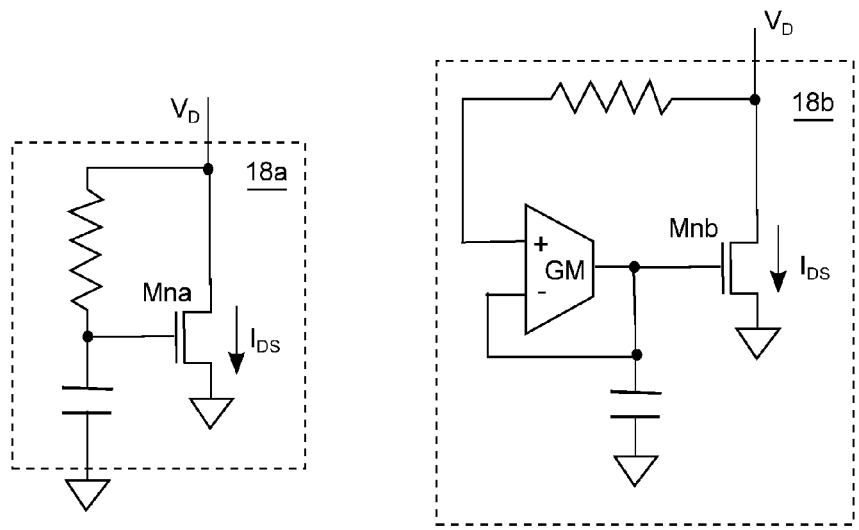
FIG. 2A
(PRIOR ART)
FIG. 2B
(PRIOR ART)

RIPPLE SUPPRESSOR

CROSS-REFERENCE TO RELATED APPLICATION

This application claims priority to and the benefit of Taiwan Application Series Number 104129275 filed on Sep. 4, 2015, which is incorporated by reference in its entirety.

BACKGROUND

The present disclosure relates generally to ripple suppressors providing driving current, and more particularly to methods and ripple suppressors that could prevent a power transistor providing driving current from operating in a linear region.

In view of its high efficiency and low power consumption, light emitting diode (LED) has been widely adapted as a lighting source in daily life. In consideration of fabrication cost, the circuit for driving LED usually employs only one single stage of a power-factor-correction (PFC) power convertor. Standing alone, a PFC power converter is well known to have a considerably high output current ripple. One common solution to reduce this output current ripple is shunt at the output of a PFC power converter a capacitor of very large capacitance, which normally is an electrolyte capacitor. As known in the art, electrolyte capacitors are bulky in size and short in life span, and not welcome by modern LED products, which are usually requested to be compact and durable.

In order to avoid using an electrolyte capacitor, ripple suppressors are proposed to stabilize the current through LEDs. FIG. 1 demonstrates a LED system 10 including a bridge rectifier 12, a buck converter 14, a LED chain 16, and a ripple suppressor 18, configuration of which is shown therein. Buck converter 14 could provide PFC and constant average output current control as well. FIGS. 2A and 2B illustrate two ripple suppressors 18a and 18b in the art, each having a power NMOS transistor (Mna or Mnb). The gate voltage of the power NMOS transistor in each of FIGS. 2A and 2B results from low-passing the drain voltage of the power NMOS transistor. As the gate voltage should be stable, the drain-to-source current $I_{DS}$ of the power NMOS transistor, which flows through the path under the gate of the power NMOS transistor and is substantially equal to the current through the LED chain 16, is proximately constant, suppressing ripples of the drain-to-source current $I_{DS}$.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein:

FIG. 1 demonstrates a LED system;

FIGS. 2A and 2B illustrate two ripple suppressors in the art;

DETAILED DESCRIPTION

The ripple suppressors 18a and 18b in FIGS. 2A and 2B are supposed to have the power NMOS transistors Mna and Mnb operate ideally in a saturate region. An idea NMOS transistor, if operating in a saturate region, has a drain-to-source current $I_{DS}$ independent to drain-to-source voltage $V_{DS}$. The power NMOS transistors Mna and Mnb are expected to be as ideal as possible. Nevertheless, cost increases for the process of making a power NMOS transistor more ideal.

Figure 3:
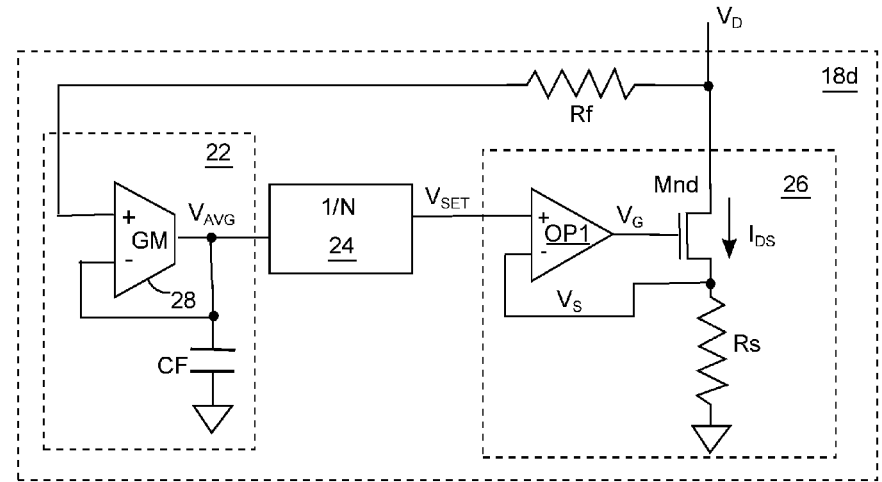
FIG. 3 demonstrates another ripple suppressor.

FIG. 3 demonstrates another ripple suppressor 18d, including a resistor Rf, a low-pass filter 22, a divider 24, and a voltage-controlled current source 26, wherein resistor Rf is optional and could be omitted in FIG. 3 and some of the embodiments in the following drawings. It doesn't matter to the performance of suppressing current ripple how ideal the power NMOS transistor Mnd in the ripple suppressor 18d is. The low-pass filter 22 has a transconductance comparator 28 and a capacitor CF, low passing the drain voltage $V_D$ to generate an average voltage $V_{AVG}$ as an output. The divider 24 divides the average voltage $V_{AVG}$ by a divisor N to generate a current-setting signal $V_{SET}$. The low-pass filter 22 and the divider 24 are deemed together to be a stabilizer for generating and stabilizing the current-setting signal $V_{SET}$. The voltage-controlled current source 26 has a power NMOS transistor Mnd, an operational amplifier OP1 and a current-sense resistor Rs. The operational amplifier OP1 outputs a gate voltage $V_G$ to the gate of the power NMOS transistor Mnd, and has two inputs coupled to receive the current-setting signal $V_{SET}$ and the current-sense signal $V_S$, respectively. The voltage-controlled current source 26 provides a negative feedback, intending to make the current-sense signal $V_S$ equal to the current-setting signal $V_{SET}$. When the power NMOS transistor Mnd is operating in a saturate region, the drain-to-source $I_{DS}$ is substantially constant, having a value equal to the voltage of current-setting signal $V_{SET}$ divided by the resistance of current-sense resistor Rs, and variation of the drain-to-source voltage $V_{DS}$ could have no impact to the drain-to-source $I_{DS}$.

Figure 4:
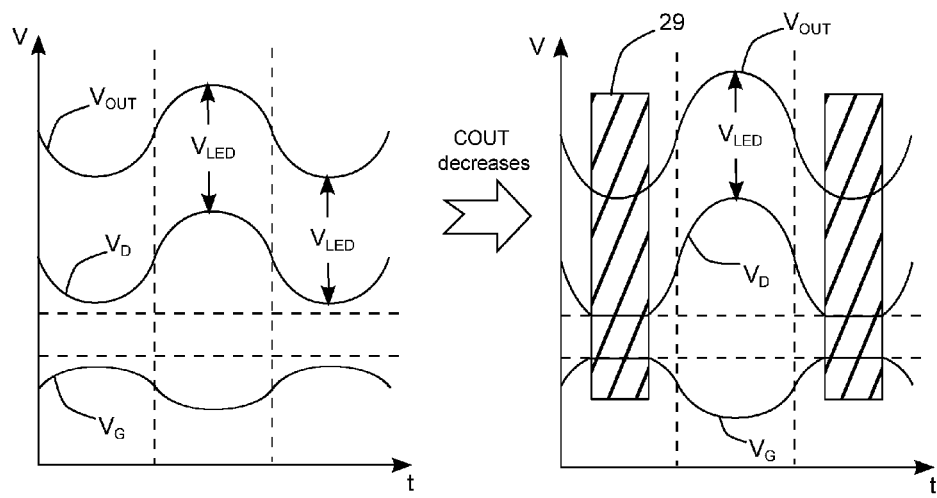
FIG. 4 demonstrates waveforms of the output voltage $V_{OUT}$, the drain voltage $V_D$ and the gate voltage $V_G$ of the ripple suppressor in FIG. 1.

FIG. 4 demonstrates waveforms of the output voltage $V_{OUT}$, the drain voltage $V_D$ and the gate voltage $V_G$ of the ripple suppressor 18 in FIG. 1. In case that the output capacitor COUT in FIG. 1 has its capacitance reduced, the waveforms of the output voltage $V_{OUT}$, the drain voltage $V_D$ and the gate voltage $V_G$ could change from the left half of the FIG. 4 to the right half. As the capacitor COUT decreases, amplitude of the vibration of the output voltage $V_{OUT}$ enlarges. FIG. 4 demonstrates at the right half some shadowed areas 29, where the drain voltage $V_D$ is too low and causes the power NMOS transistor Mnd in the voltage-controlled current source 26 to operate in a linear region instead of in a saturate region. As a result, the drain-tosource $I_{DS}$ starts decreasing in these shadowed areas 29, no more being held as a constant, and the luminance of the LED chain 16 darkens accordingly. In other words, it implies that the right half of FIG. 4 has issues of flickering.

Figure 5:
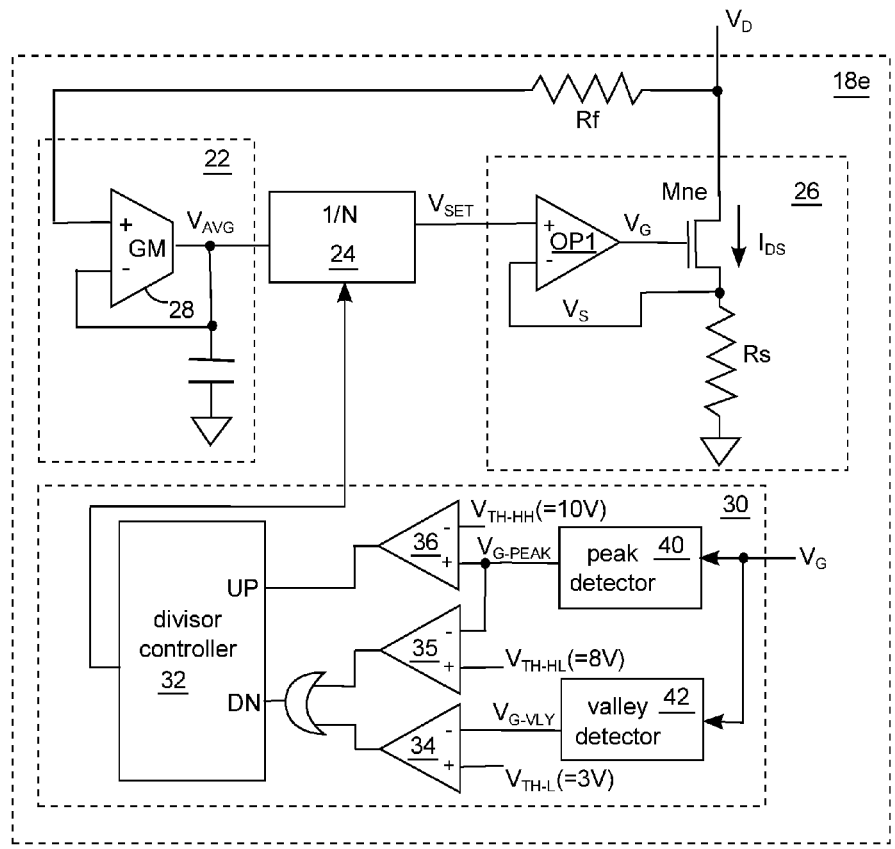
FIG. 5 shows a ripple suppressor according to embodiments of the invention.
Figure 6:
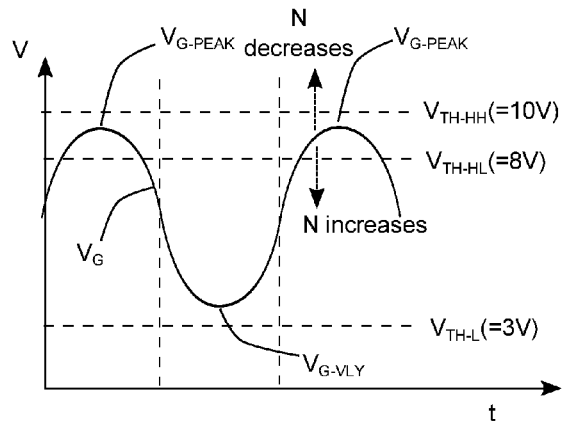
FIG. 6 demonstrates how peaks and valleys are affected by variation of divisor N.

FIG. 5 shows a ripple suppressor 18e according to embodiments of the invention. Different from the ripple suppressor 18d in FIG. 3, the ripple suppressor 18e in FIG. 5 has additionally an auto-calibration circuit 30, which monitors the gate voltage $V_G$ to control the divisor N used by the divider 24, so as to make the gate voltage $V_G$ in compliance with a predetermined condition. In FIG. 5, this predetermined condition is substantially confine peaks $V_{G\text{-}PEAK}$ of the gate voltage $V_G$ to the range between predetermined values $V_{TH\text{-}HH}$ and $V_{TH\text{-}HL}$, and restrict valleys $V_{G\text{-}VLY}$ of the gate voltage $V_G$ not to be less than a predetermined value $V_{TH\text{-}L}$ as shown in FIG. 6. In one embodiment of the invention, predetermined values $V_{TH\text{-}HH}$, $V_{TH\text{-}HL}$ and $V_{TH\text{-}L}$ are 10V, 8V and 3V, respectively. The predetermined values $V_{TH\text{-}HH}$ and $V_{TH\text{-}HL}$ are the top and bottom limits of the range, respectively.

The auto-calibration circuit 30 has a peak detector 40 and a valley detector 42, monitoring the gate voltage $V_G$ to sequentially generate peaks $V_{G\text{-}PEAK}$ and valleys $V_{G\text{-}VLY}$. When a present peak $V_{G\text{-}PEAK}$ exceeds the predetermined value $V_{TH\text{-}HH}$ the output of the comparator 36 makes the divisor controller 32 increase the divisor N of the divider 24, so the current-setting signal $V_{SET}$ decreases, causing the decrement of a next peak $V_{G\text{-}PEAK}$. Similarly, if a present peak $V_{G\text{-}PEAK}$ is below the predetermined value $V_{TH\text{-}HL}$ the output of the comparator 35 makes the divisor controller 32 decrease the divisor N of the divider 24, so the current-setting signal $V_{SET}$ increases, causing the increment of a next peak $V_{G\text{-}PEAK}$. If a present valley $V_{G\text{-}VLY}$ is below the predetermined value $V_{TH\text{-}L}$ the output of the comparator 34 could make the divisor controller 32 decrease the divisor N of the divider 24, so a next valley $V_{G\text{-}VLY}$ increases as a result. In one embodiment, the divisor controller 32 might increase or decrease the divisor N once every 50 ms.

As the time goes by, the auto-calibration circuit 30 can confine peaks $V_{G\text{-}PEAK}$ of the gate voltage $V_G$ to the range between the predetermined values $V_{TH\text{-}HH}$ and $V_{TH\text{-}HL}$, and restrict valleys $V_{G\text{-}VLY}$ of the gate voltage $V_G$ not to be less than the predetermined value $V_{TH\text{-}L}$.

Keeping peaks $V_{G\text{-}PEAK}$ under the predetermined value $V_{TH\text{-}HH}$ is beneficial since the power NMOS transistor might operate in an unfavorable linear region if the gate voltage is high above the predetermined value $V_{TH\text{-}HH}$. In other words, keeping peaks $V_{G\text{-}PEAK}$ under the predetermined value $V_{TH\text{-}HH}$ prevents the power NMOS transistor from operating in a region other than a saturate region. Keeping peaks $V_{G\text{-}PEAK}$ above the predetermined value $V_{TH\text{-}HL}$ intentionally raises the gate voltage $V_G$ to enjoy a lower ON resistance $R_{DS\text{-}ON}$ of the power NMOS transistor Mne, thereby reducing the power consumption caused by ripple suppressor 18e. Likely, keeping valleys $V_{G\text{-}VLY}$ above the predetermined value $V_{TH\text{-}L}$ prevents a very low gate voltage $V_G$ that could result in a higher ON resistance $R_{DS\text{-}ON}$ of the power NMOS transistor Mne and cause the ripple suppressor 18e to consume much power.

Figure 7:
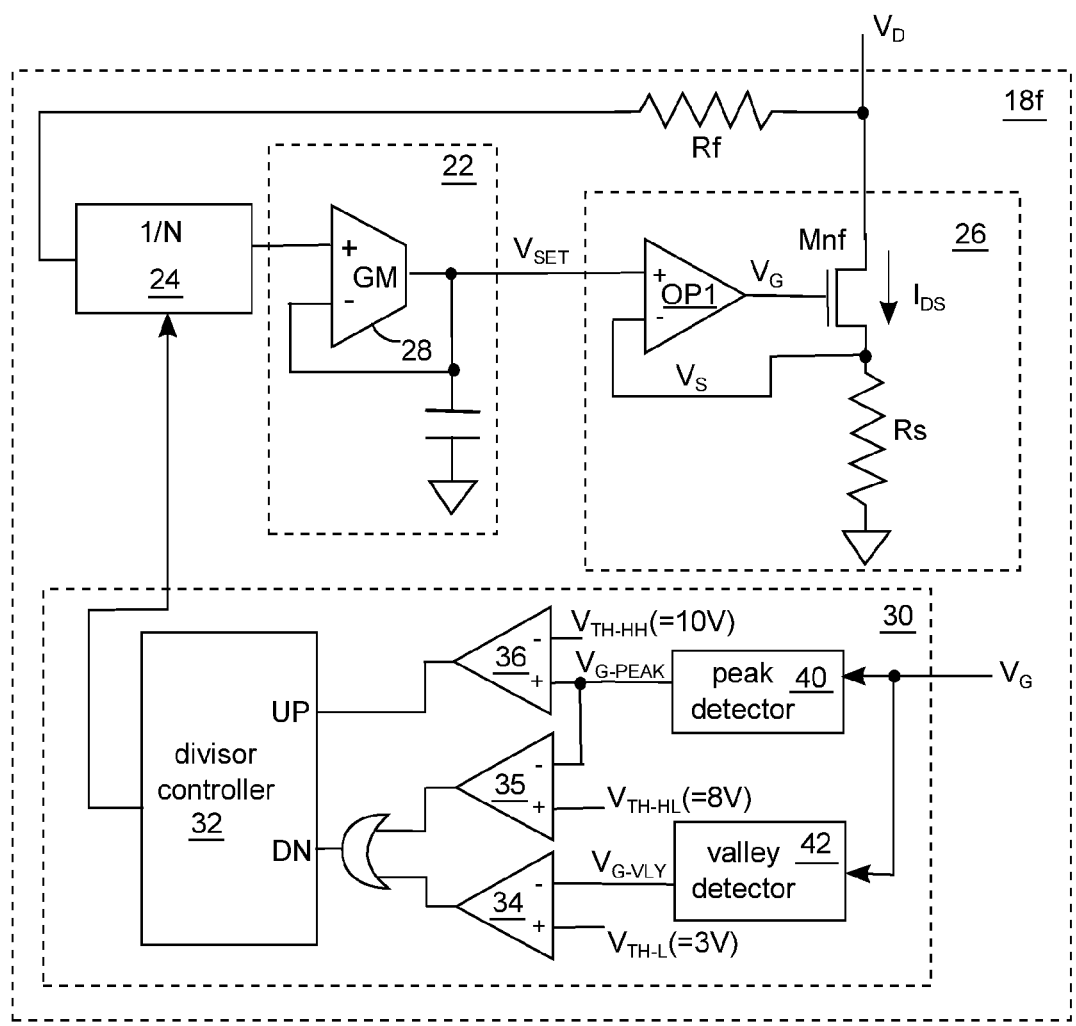
FIG. 7 demonstrates another ripple suppressor according to embodiments of the invention.

The current-setting signal $V_{SET}$ in FIG. 5 is generated by processing the drain voltage $V_D$ first through the low-pass filter 22 and second through the divider 24. The low-pass filter 22 low passes the drain voltage $V_D$ first to generate a filtered signal, which then is divided by the divisor N of the divider 24 to output the current-setting signal $V_{SET}$. The low-pass filter 22 and the divider 24 are connected in cascade. This invention is not limited to FIG. 5, nevertheless. FIG. 7 demonstrates another ripple suppressor 18f according to embodiments of the invention, where the low-pass filter 22 follows the divider 24 while the divisor controller 32 controls the divisor N used by the divider 24. In other words, in FIG. 7, the divider 24 first divides the drain voltage $V_D$ to generate an intermediate signal, which is then low passed to generate the current-setting signal $V_{SET}$. The ripple suppressor 18f of FIG. 7 could enjoy the same advantage with the ripple suppressor 18e of FIG. 5.

Figure 8A:
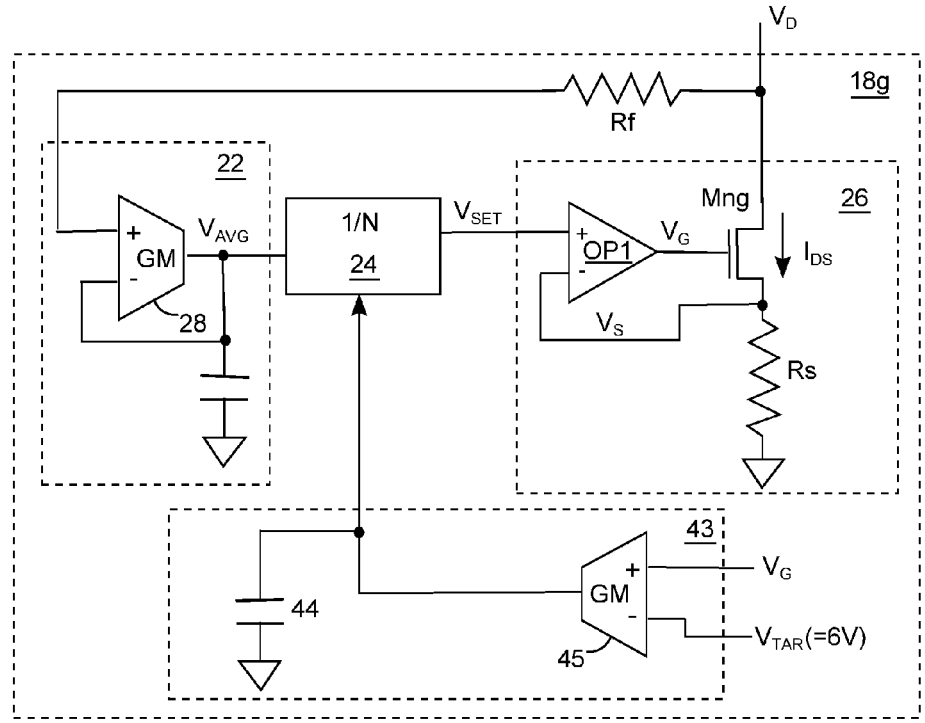
FIGS. 8A and 8B demonstrates two ripple suppressors according to embodiments of the invention.

FIG. 8A demonstrates another ripple suppressor 18g according to embodiments of the invention. The ripple suppressor 18g also has an auto-calibration circuit 43, which monitors the gate voltage $V_G$ to control the divisor N used by the divider 24, so as to make the gate voltage $V_G$ in compliance with a predetermined condition. In this embodiment, this predetermined condition is that an average of the gate voltage $V_G$ is about a predetermined value $V_{TAR}$, which is 6V for example. The auto-calibration circuit 40 is basically an averaging circuit with a transconductance comparator 45 and a capacitor 44. In response to difference between the gate voltage $V_G$ and the predetermined value $V_{TAR}$, the transconductance comparator 45 charges or discharges the capacitor 44, whose voltage, as an output, controls the divisor N of the divider 24.

For example, if an average of the gate voltage $V_G$ exceeds the predetermined value $V_{TAR}$, the voltage of the capacitor 44 raises, causing the divisor N to increase, preferably once every 50 ms, so as to lower the current-setting signal $V_{SET}$, and the average of the gate voltage $V_G$ as well. In the opposite, if an average of the gate voltage $V_G$ is below the predetermined value $V_{TAR}$, the auto-calibration circuit 43 will reduce the voltage of the capacitor 44, and both the current-setting signal $V_{SET}$ and the average of the gate voltage $V_G$ increase accordingly. The auto-calibration circuit 43 therefore makes an average of the gate voltage $V_G$ substantially equal to the predetermined value $V_{TAR}$. This achievement could prevent the power NMOS transistor Mng from wrongly operating in a linear region due to an overhigh gate voltage $V_G$, or from inefficiently consuming too much power because of a much low gate voltage $V_G$.

Figure 8B:
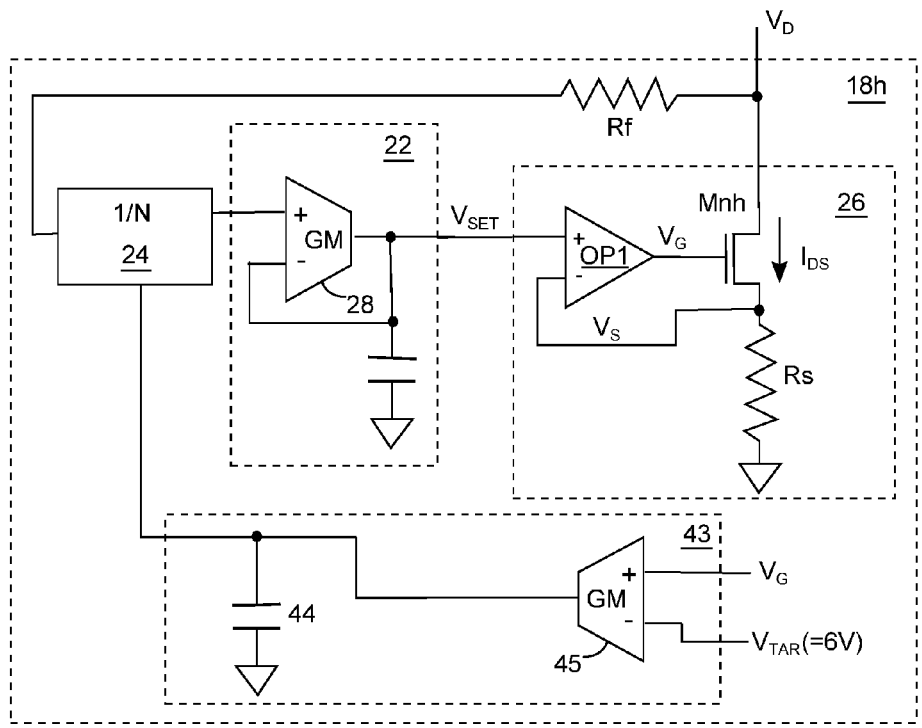

In FIG. 8A, the divider 24 follows the low-pass filter 22 to generate the current-setting signal $V_{SET}$, but this invention is not limited to. FIG. 8B demonstrates a ripple suppressor 18h according to embodiments of the invention, where the low-pass filter 22 follows the divider 24 to generate the current-setting signal $V_{SET}$ while the auto-calibration circuit 43 controls the divisor N used by the divider 24.

Figure 9A:
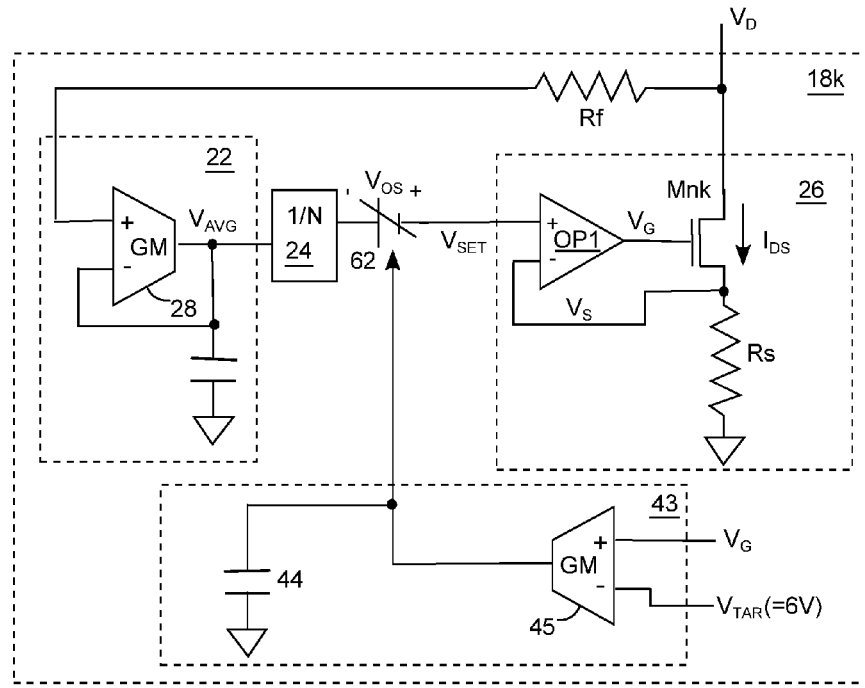
FIGS. 9A to 9C demonstrate three ripple suppressors according to embodiments of the invention.
Figure 9B:
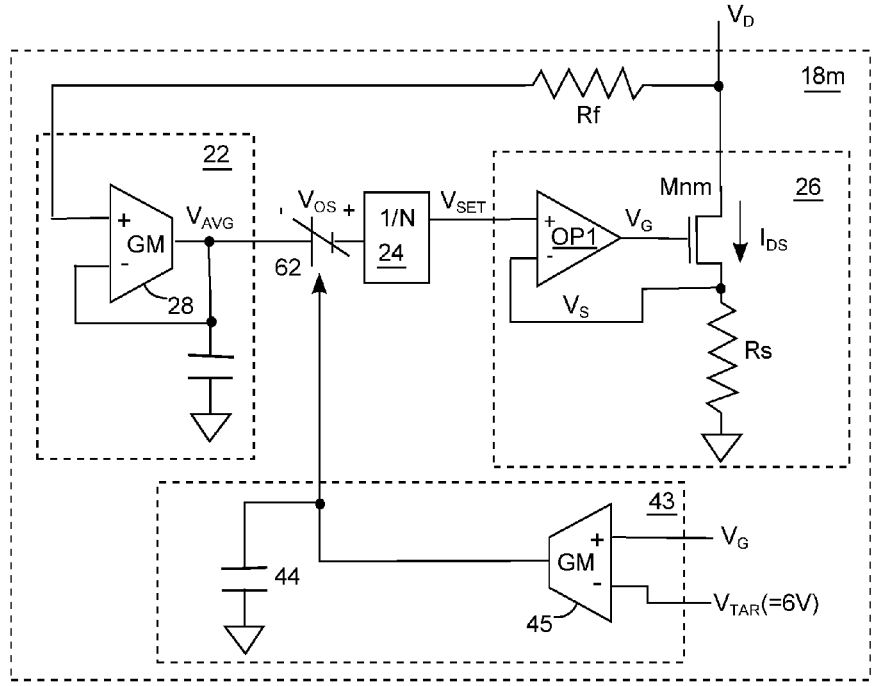
Figure 9C:
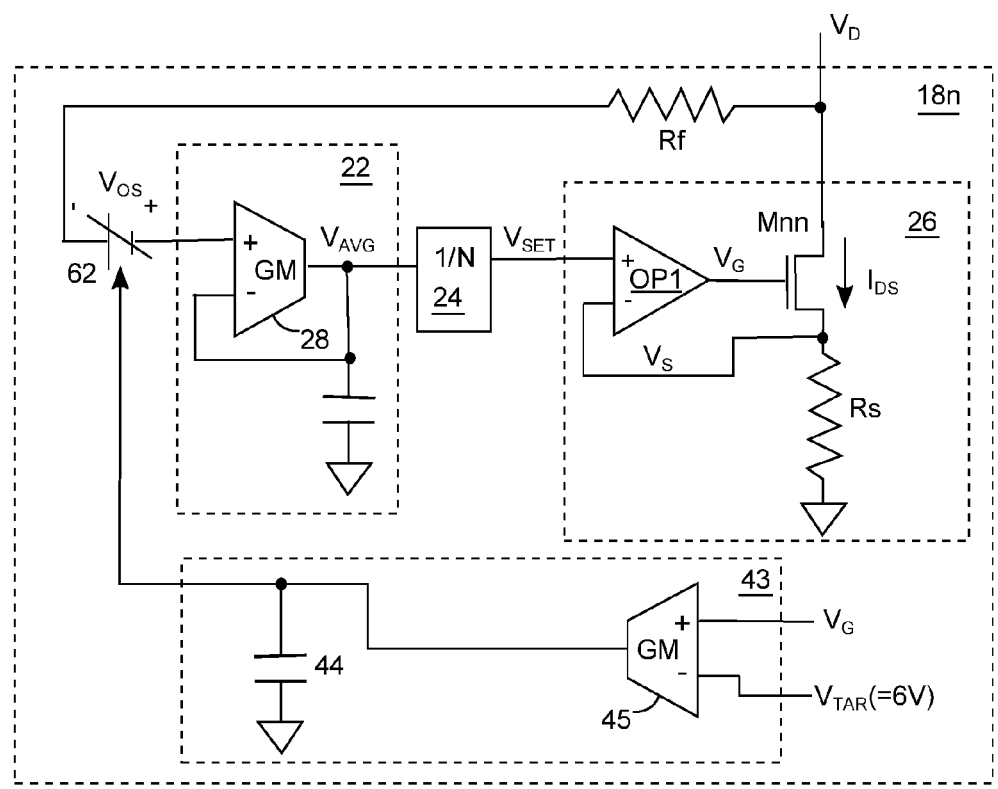

Each auto-calibration circuit in FIGS. 5, 7, 8A and 8B controls a divisor used by a divider, but the invention is not limited to. FIGS. 9A to 9C demonstrate three ripple suppressors 18k, 18m and 18n, where each auto-calibration circuit 43 controls an offset voltage $V_{OS}$ provided by an offset circuit 62. Taking the ripple suppressor 18k for example, the low-pass filter 22, the divider 24, and the offset circuit 62 are connected in cascade. The offset circuit 62 is connected between the divider 24 and the voltage-controlled current source 26, providing an offset voltage $V_{OS}$ to add to the output of divider 24. If an average of the gate voltage $V_G$ exceeds the predetermined value $V_{TAR}$, for example, the offset voltage $V_{OS}$ ramps down slowly, possibly once every 100 ms, the current-setting signal $V_{SET}$ reduces, so as to lower the average of the gate voltage $V_G$, and vice versa. The ripple suppressor 18k therefore makes an average of the gate voltage $V_G$ substantially equal to the predetermined value $V_{TAR}$.

The offset circuit 62 in FIG. 9B is connected between the low-pass filter 22 and the divider 24. The offset circuit 62 in FIG. 9C is connected between the drain of the power NMOS transistor Mnn and the low-pass filter 22. Based on the aforementioned teaching, each of the ripple suppressors 18*m* and 18*n* in FIGS. 9B and 9C could also make an average of the gate voltage $V_G$ substantially equal to the predetermined value $V_{TAR}$.

Similarly, in some embodiments of the invention, the auto-calibration circuit 43 in each of FIGS. 9A, 9B and 9C could be replaced with the auto-calibration circuit 30 of FIG. 5. An auto-calibration circuit according to embodiments of the invention could monitor the gate voltage of a power NMOS transistor to control a divisor of a divider or an offset voltage of an offset circuit. An auto-calibration circuit could confine peaks of the gate voltage within a predetermined range, or make an average of the gate voltage equal to a predetermined value.

Based on the aforementioned embodiments, an auto-calibration circuit monitors the gate voltage $V_G$ to adjust the current-setting signal $V_{SET}$, so as to make the gate voltage $V_G$ in compliance with a predetermined condition. This predetermined condition could keep a power NMOS transistor away from operating in a linear region or make the power NMOS transistor operate more efficiently.

While the invention has been described by way of examples and in terms of preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A ripple suppressor, comprising:
   a power transistor with a control node, a first channel node, and a second channel node, wherein a control voltage at the control node controls a channel current through a path connecting the first and second channel nodes;
   a current-sense resistor connected between the second channel node and a ground line, for providing a current-sense signal;
   an operational amplifier with two inputs respectively coupled to receive the current-sense signal and a current-setting signal, wherein an output of the operational amplifier controls the control node to make the current-sense signal substantially equal to the current-setting signal;
   a stabilizer coupled to the first channel node for generating the current-setting signal, wherein the stabilizer at least provides low-pass filtering to substantially stabilize the current-setting signal in response to a first channel voltage at the first channel node; and
   an auto-calibration circuit for controlling the stabilizer in response to the control voltage, so as to make the control voltage in compliance with a first predetermined condition.

2. The ripple suppressor of claim 1, wherein the stabilizer comprises:
   a low-pass filter for low passing the first channel voltage to generate a filtered signal; and
   a divider for dividing the filtered signal by a divisor to generate the current-setting signal;
   wherein the auto-calibration circuit controls the divisor.

3. The ripple suppressor of claim 1, wherein the stabilizer comprises:
   a divider for dividing the first channel voltage by a divisor to generate an intermediate signal;
   a low-pass filter for low passing the intermediate signal to generate the current-setting signal;
   wherein the auto-calibration circuit controls the divisor.

4. The ripple suppressor of claim 1, wherein the stabilizer comprises:
   an offset circuit for providing an offset voltage to adjust the current-setting signal;
   wherein the auto-calibration circuit controls the offset voltage.

5. The ripple suppressor of claim 4, wherein the stabilizer comprises a low-pass filter connected to one of the inputs of the operational amplifier, and the offset circuit is connected between the first channel node and the low-pass filter.

6. The ripple suppressor of claim 4, wherein the stabilizer comprises a low-pass filter connected to the first channel node, and the offset circuit is connected between the low-pass filter and the operational amplifier.

7. The ripple suppressor of claim 1, wherein the auto-calibration circuit affects the current-setting signal by way of the stabilizer, so as to substantially limit the control voltage under a predetermined top limit.

8. The ripple suppressor of claim 7, wherein the auto-calibration circuit comprises:
   a first comparator for comparing the control voltage with the predetermined top limit;
   wherein when the control voltage exceeds the predetermined top limit, the auto-calibration circuit causes the current-setting signal to be reduced.

9. The ripple suppressor of claim 8, wherein the auto-calibration circuit further comprises:
   a second comparator for comparing the control voltage with a predetermined bottom limit;
   wherein when the control voltage is below the predetermined bottom limit, the auto-calibration circuit causes the current-setting signal to be increased.

10. The ripple suppressor of claim 1, wherein the auto-calibration circuit affects the current-setting signal by way of the stabilizer, so as to make an average of the control voltage substantially equal to a predetermined value.

11. The ripple suppressor of claim 10, wherein the auto-calibration circuit comprises an averaging circuit providing an output signal in response to a difference between the control voltage and the predetermined value.

12. The ripple suppressor of claim 11, wherein the averaging circuit comprises a transconductance comparator and a capacitor, wherein the transconductance comparator compares the control voltage with the predetermined value to charge or discharge the capacitor.

13. The ripple suppressor of claim 11, wherein the stabilizer comprises a divider with a divisor controlled by the averaging circuit.

14. A ripple suppressor, comprising:
   a voltage-controlled current source with a control node, a first channel node and a second channel node, wherein a control voltage at the control node controls a channel current through a path connecting the first and second channel nodes, and the voltage-controlled current source receives a current-setting signal to generate the control voltage, so as to stabilize the channel current in response to the current-setting signal;
   a stabilizer coupled to the first channel node for generating the current-setting signal, wherein the stabilizer at least provides low-pass filtering to substantially stabilize the current-setting signal in response to a first channel voltage at the first channel node; and an auto-calibration circuit for controlling the stabilizer in response to the control voltage, so as to make the control voltage in compliance with a first predetermined condition;

wherein the first predetermined condition is that the control voltage is substantially limited under a predetermined top limit, or that the control voltage has an average substantially equal to a predetermined value.

15. The ripple suppressor of claim 14, wherein the stabilizer comprises a low-pass filter and a divider connected in cascade to generate the current-setting signal, and the auto-calibration circuit controls a divisor used by the divider to affect the current-setting signal.

16. The ripple suppressor of claim 14, wherein the stabilizer comprises a low-pass filter and an offset circuit connected in cascade to generate the current-setting signal, and the auto-calibration circuit controls an offset voltage provided by the offset circuit to affect the current-setting signal.

17. The ripple suppressor of claim 14, wherein the first predetermined condition is peaks of the control voltage are confined to be between the predetermined top limit and a predetermined bottom limit.

18. The ripple suppressor of claim 14, wherein The auto-calibration circuit comprises an averaging circuit providing an output signal in response to a difference between the control voltage and the predetermined value.

19. The ripple suppressor of claim 14, wherein the auto-calibration circuit comprises a peak detector and a valley detector, monitoring the control voltage to generate peaks and valleys respectively.

20. The ripple suppressor of claim 14, wherein the auto-calibration circuit comprises a comparator for comparing a present peak with the predetermined top limit.

* * * * *